United States Patent [19]
Simon et al.

[11] Patent Number: 5,478,412
[45] Date of Patent: Dec. 26, 1995

[54] PLASTIC SHEET FOR A LAMINATED GLAZING AND METHOD FOR CONTROLLING ADHESION AND REDUCING BLOCKING THEREOF

[75] Inventors: Robert H. M. Simon; Peter H. Farmer, both of Longmeadow, Mass.

[73] Assignee: Monsanto Company, St. Louis, Mo.

[21] Appl. No.: 70,366

[22] PCT Filed: Dec. 20, 1990

[86] PCT No.: PCT/US90/07554

§ 371 Date: Jun. 7, 1993

§ 102(e) Date: Jun. 7, 1993

[51] Int. Cl.[6] .................................................. B32B 3/00
[52] U.S. Cl. ................... 428/142; 428/166; 428/195; 428/198; 428/425.6; 428/424.8; 428/437; 428/441; 427/256; 156/87; 156/102; 156/104; 156/106; 156/286
[58] Field of Search ................... 428/437, 424.8, 428/425.6, 441, 166, 141, 142, 195, 198, 437; 156/87, 102, 104, 286, 106; 427/256

[56] References Cited

U.S. PATENT DOCUMENTS

| | | | |
|---|---|---|---|
| 2,739,080 | 3/1956 | Woodworth | 117/38 |
| 3,554,835 | 1/1971 | Morgan | 156/234 |
| 3,591,406 | 7/1971 | Moynihan | 117/37 |
| 3,881,043 | 4/1975 | Rieser et al. | 428/81 |
| 4,452,840 | 6/1984 | Sato et al. | 428/156 |
| 5,246,764 | 9/1993 | La Porte et al. | 428/159 |
| 5,342,653 | 8/1994 | Simon et al. | 427/265 |
| 5,346,569 | 9/1994 | Simon | 156/87 |

FOREIGN PATENT DOCUMENTS

| | | |
|---|---|---|
| 3731465 | 3/1988 | Germany . |
| 60-28481 | 2/1985 | Japan . |
| 1215318 | 12/1970 | United Kingdom . |
| 2040792 | 9/1980 | United Kingdom . |

*Primary Examiner*—Edith Buffalow
*Attorney, Agent, or Firm*—Michael J. Murphy; Mark F. Wachter

[57] ABSTRACT

A plastic sheet, preferably of plasticized partial polyvinyl butyral, for a laminated safety glazing, having means dispersed on its surface, preferably comprising a multiplicity of spaced projections, capable of resisting adhesion to a rigid panel, such as glass, of such a glazing when the sheet is laminated to the panel, the area of the sheet surface without such dispersed means having high affinity for adhesion. The projections physically block adhesion of a dispersed area of the sheet to the panel in that the means on the sheet surface have no or weak interfacial adhesion. The multiplicity of space projections also have low or no affinity for adhesion when in blocking contact with each other or with another plasticized partial polyvinyl butyral surface and thereby increase blocking resistance.

29 Claims, 2 Drawing Sheets

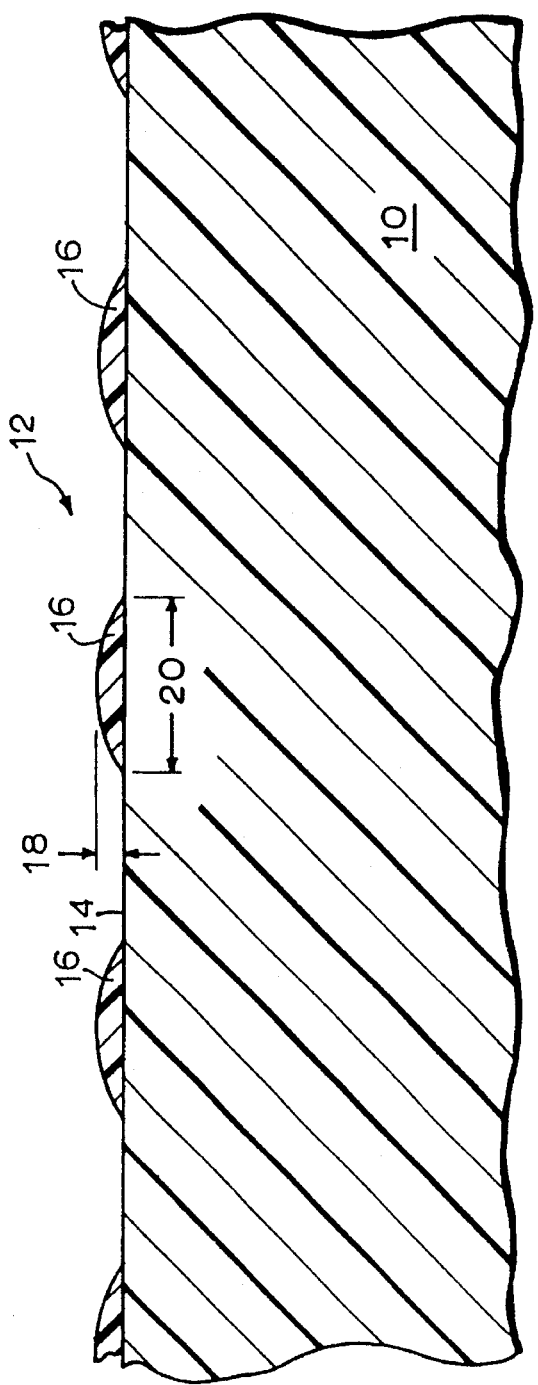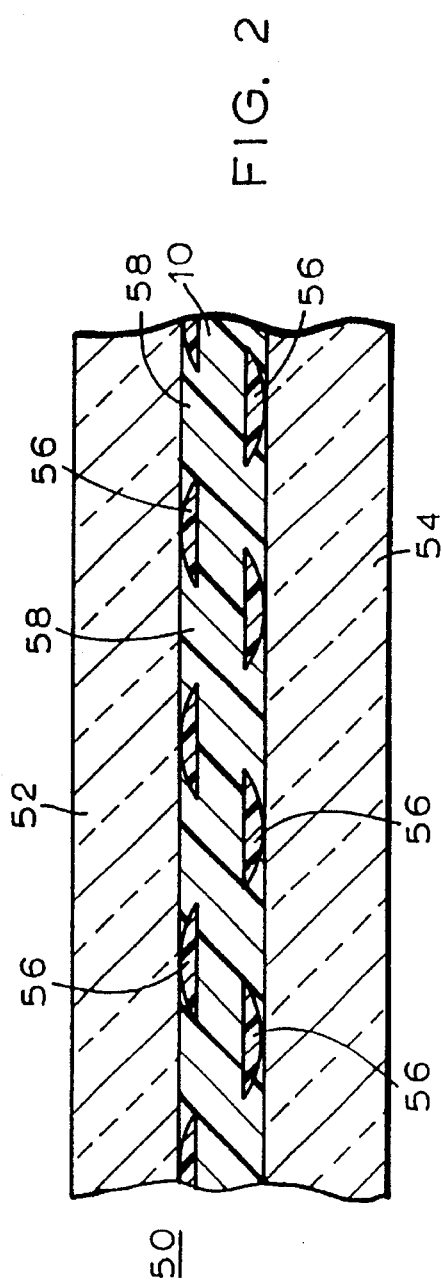

PLASTIC SHEET FOR A LAMINATED GLAZING AND METHOD FOR CONTROLLING ADHESION AND REDUCING BLOCKING THEREOF

BACKGROUND OF THE INVENTION

This invention relates to plastic sheet for a laminated glazing and more particularly to controlling adhesion of such sheet to a glazing panel and increasing its resistance to blocking.

Layered, light transmitting safety glazings for window, windshield, sunroof, skylight, intrusion security, showcase, picture frame and like applications are well known. They include one or more rigid transparent panels such as glass combined in a laminate with an impact-dissipating plastic sheet such as plasticized polyvinyl butyral (PVB). It is likewise well established to carefully control the strength of the bond between the plastic sheet and rigid panel at a desired level since if too high the plastic sheet undesirably ruptures on impact and if too low splinters from the rigid panel can separate from the glazing, and, if glass, can injure a person in the surrounding area.

Heretofore, as far as presently known, this bond strength was customarily controlled (as typically disclosed for plasticized PVB in U.S. Pat. No. 3,249,488) by including in the formulation of the sheet chemical adhesion control additives such as alkali and alkaline earth metal salts and bases, metal salts of organic carboxylic and aromatic acids and the like. These anti-adhesion chemical additives which acre present in very small quantities in the sheet (generally less than ½ weight %) function on a molecular scale and, in the case of polyvinyl butyral with glass where the bond is too strong, are thought to reduce bond strength by occupying sites on the glass and/or plastic sheet which might normally bond to each other. These additives often have an affinity for water and require careful control to avoid absorption of moisture which can produce undesirable haze in the transparent sheet. When present in such small quantities, accurate control of the additives concentration is difficult, particularly on a commercial scale. Since the additives are thought to interact with the glass, variations in the quality of the glass surface affects bond strength which is often not reproducible. Control of the adhesion of plastic sheet to rigid panels in a laminated safety glazing without relying on chemical additives would be desirable.

Furthermore, plasticized PVB sheet notoriously tends to stick to itself (sometimes called "blocking") at ambient temperatures typically encountered during storage before laminating and expensive precautions have been taken to prevent this. For example, the sheet has been transported and stored at low refrigeration temperatures, or interleafed with polyethylene film or dusted between facing layers with sodium bicarbonate. It has been and continues to be very desirable to alleviate this blocking problem associated with plasticized PVB sheet.

SUMMARY OF THE INVENTION

Now improvements have been made to alleviate shortcomings of the prior art in controlling adhesion of plastic sheet in laminated safety glazings and improving resistance to blocking when the sheet is plasticized PVB.

Accordingly, a principal object of this invention is to provide plastic sheet having an improved capability for controlling its adhesion to a rigid transparent member of a laminated safety glazing.

Another object is to mechanically (as opposed to chemically) control such adhesion on a macroscopic scale—i.e. observable by the naked eye or low power magnification.

A specific object is to substantially duplicate, using contact area adhesion control, the impact performance of a safety glazing where chemical adhesion control is being used.

An additional object is to provide a laminated safety glazing containing sheet displaying the aforesaid improved adhesion control.

A further object is to provide such improvements in a plasticized partial polyvinyl butyral sheet and further to reduce the tendency of such sheet to stick to itself during handling before laminating.

Yet an additional object is to provide methods for achieving the foregoing objects.

Other objects of this invention will in part be obvious and will in part appear from the following description and claims.

These and other objects are accomplished by providing a plastic sheet for a laminated safety glazing having means dispersed on its surface capable of resisting adhesion to a rigid panel of such safety glazing when the sheet is laminated to such panel, the area of the sheet surface without such dispersed means having high affinity for adhesion to the panel. The dispersed means preferably comprises a multiplicity of spaced projections.

Another aspect of the invention is provision of a method of controlling adhesion of a plastic safety glazing sheet to a rigid laminating panel which comprises physically blocking adhesion of a dispersed area of the sheet to the panel by means on the sheet surface having no or weak interfacial adhesion to the panel.

Further provided is a safety glazing comprising at least one glass sheet laminated to a plastic sheet having dispersed on its surface means unbonded or weakly bonded to the glass sheet, the surface of the plastic sheet without such means being firmly bonded to the glass sheet.

A further aspect is provision of a process for increasing the resistance to blocking of plasticized partial polyvinyl butyral sheet which comprises applying a multitude of spaced projections on the surface of the sheet which have low or no affinity for adhesion when in blocking contact with each other or with another plasticized partial polyvinyl butyral surface.

Yet a further aspect is provision of a process for increasing resistance to blocking and reducing adhesion during lamination to glass of plasticized partial polyvinyl butyral sheet which comprises applying a multitude of spaced projections to the surface of the sheet which have low or no affinity for i) blocking adhesion when in contact with each other or with another plasticized partial polyvinyl butyral surface and ii) adhesion to glass in a laminated safety glazing.

BRIEF DESCRIPTION OF THE DRAWINGS

In describing the overall invention, reference will be made to the accompanying drawings wherein:

FIG. 1 is an enlarged, cross-sectional view of sheet according to the invention;

FIG. 2 is a cross-sectional view through a laminate showing the interface of the sheet of FIG. 1 with glass;

DETAILED DESCRIPTION OF THE INVENTION

Figure 3:
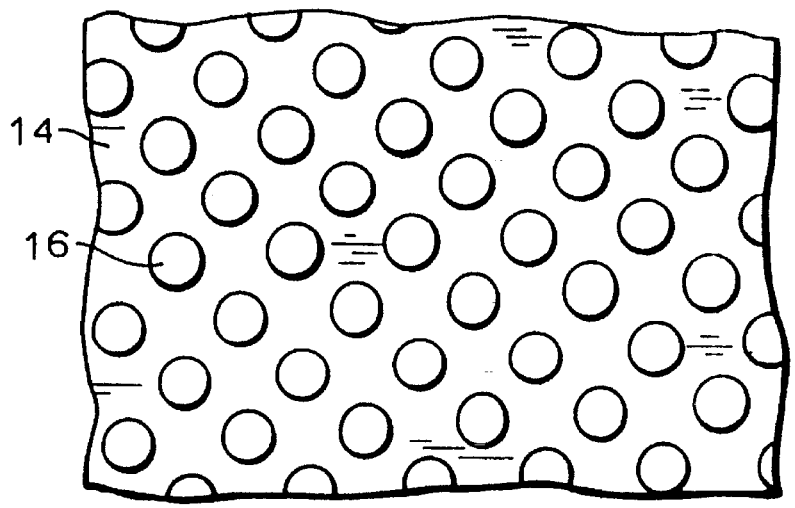
FIG. 3 is a plan view of a pattern of adhesion-resisting projections during an intermediate stage of the process for applying them to the sheet surface.

Referring now to the drawings, plastic sheet 10 is shown in FIG. 1 for a laminated safety glazing 50 (FIG. 2) having means 12 on at least one, e.g. 14, and preferably both of its major side surfaces capable of resisting adhesion to a rigid panel, such as glass, of such a safety glazing when sheet 10 containing means 12 is laminated to such a panel in a manner to be further described. The area of the sheet surface 14 without such dispersed means 12 typically has high affinity for adhesion to the rigid panel of the safety glazing.

To be functional in safety glazing 50, the plastic of sheet 10 must be optically clear when in glazing 50 (have less than about 4% and preferably less than 2% haze) and capable of being strongly bonded by heat and pressure to the rigid panel to form an impact-dissipating layer in safety glazing 50. Exemplary plastics which can be used include poly(ethylene-vinyl acetate), poly(ethylene-vinyl acetate-vinyl alcohol), poly(ethylene-methyl methacrylate-acrylic acid), polyurethane, plasticized polyvinyl chloride, etc. Plasticized polyvinyl butyral and more particularly partial polyvinyl butyral containing about 10 to 30 weight % hydroxyl groups expressed as polyvinyl alcohol is preferred. Such partial PVB is well known and further comprises about 0 to 2.5 weight % acetate expressed as polyvinyl acetate with the balance being butyral expressed as polyvinyl butyral. The thickness of plasticized partial PVB sheet (10 in FIG. 1) is about 0.25 to 1.5, preferably about 0.35 to 0.75 mm. It is commercially available from Monsanto Company as Saflex® sheet and E. I. dupont de Nemours and Co. as Butacite® polyvinyl butyral resin sheeting.

Though transparent glass is preferred, the rigid member of the laminated safety glazing may alternatively be made of transparent plastic such as polycarbonate, poly(methyl methacrylate), poly(ethylene terephthalate) and the like.

Means 12 in the illustrated embodiment comprises a multiplicity of vertically shallow, adhesion-resisting projections, representatively numbered 16, spaced from each other with gaps in between in a discontinuous, dispersed manner on surface 14 of sheet 10. Though not essential, for optimum control, projections 16 preferably form an ordered pattern on sheet surface 14 as more particularly illustrated in FIG. 3.

The extent of coverage of sheet surface 14 with projections 16 can vary depending on the glazing application. Projections 16 generally usually cover from about 10 to about 60%, preferably 20 to 45% of the sheet surface area 14 from which they project. At less than about 10% coverage, with plasticized partial PVB sheet no appreciable adhesion-control advantage is noted using glass, whereas at more than about 60% adhesion is decreased too much. For the preferred plasticized partial PVB, at 0.76 mm sheet thickness projections 16 are preferably regulated to provide a mean break height (MBH) at 21° C. of between about 4.5 to 11 m when measured for impact resistance in a laminate with two glass layers in accordance with the procedure later further described herein. In terms of number, projections 16 are typically present at a frequency of about 38 to 3800 projections per square cm of sheet surface 14. Depending on size, individual projections typically extend (dimension 18 in FIG. 1) at least about 0.5 mils (0.013 mm) from surface 14. Projections 16 need not be individually precisely dimensioned and can be of arbitrary shape such as conical, elliptical, oblong, oval, rectangular, square or other similar shape. The illustrated shape is circular in transverse cross-section and is preferred. Projections 16 are minute and akin to dots, diameter 20 (FIG. 1) and height 18 of the preferred circular cross-sectional shape for a representative coverage of about 22% of surface area 14 of sheet 10 being typically respectfully about 0.2 mm and 0.03 mm with about 650 such projections per square cm of sheet surface.

The material of projections 16 can vary as long as it has weak or no adhesion to the surface of the rigid panel of the safety glazing yet does adhere to the surface of the sheet at a level at least adequate to resist accidental removal during handling before lamination. A peel strength at the interface with sheet 10 of at least about 2 N/cm is generally adequate to achieve this. Projections 16 may be of inorganic material such as glass, fumed silica, sol gel etc. In the illustrated embodiment, projections 16 are formed of a plastic material which is different from that of sheet 10. Representative plastics include melamines, uncrosslinked polyurethane, polyvinyl formal, polyvinyl chloride, poly(methyl methacrylate), polycarbonate and crosslinked plastics such as crosslinked polyvinyl butyral, epoxies and the like. When sheet 10 is of plasticized partial PVB, a particularly preferred plastic for projections 16 is crosslinked polyurethane to be further described. Projections 16 are preferably clear and colorless and substantially visually imperceptible in laminated safety glazing 50. To achieve this the refractive index of the material of the projections, and specifically of the preferred crosslinked polyurethane form of projection, preferably substantially matches that of the plastic of sheet 10, and specifically that of the preferred plasticized partial PVB of sheet 10.

Alternative forms of means 12 which can be used in the invention include reactive liquids which, on being deposited on the sheet surface by spraying or equivalent method(s), produces a chemical change on the affected dispersed areas which resist adhesion to the rigid member of the safety glazing. Also the sheet surface could be chemically modified by irradiating using an appropriate mask or by programming the irradiating beam to develop a crosslinked pattern on or chemically modify the sheet surface.

Referring now to FIG. 2, layered laminated safety glazing 50 is typically conventionally formed by joining the members under elevated conditions of temperature and pressure (about 140° C., 1135 kPa for 30 min) known to those skilled in the art to strongly bond surfaces of rigid (e.g. glass) layers 52, 54 to the regions of sheet 10 of FIG. 1 intermediate dispersed projections 16. The actual configuration of projections 16 when combined with the plasticized partial PVB under heat and pressure to form laminate 50 with glass is not precisely known but is presently believed to be substantially as shown in FIG. 2, although it could vary somewhat from the FIG. 2 illustration. The elevated pressure of the laminating step slightly compresses projections 16 in the laminate (vis-a-vis the unstressed configuration of FIG. 1) and they are illustratively shown as 56 in FIG. 2 in compressed form. In the embodiment shown, when the polyurethane formulation is purposely colored with carbon black to facilitate examination, the projections are still visually apparent in the laminate. When made of a different material, however, or with different autoclave conditions, such projections might be further or even completely flattened which is not of particular concern as long as the adhesion-resisting function is provided. During autoclave laminating forming the structure of FIG. 2, the partial PVB of the sheet 10 melts at the elevated temperature encountered and flows around projections 56 to fill any voids and provide the void-free interface shown. The cross-linked polyurethane plastic of compressed projections 56 has no or weak interfacial adhesion to the surfaces of glass layers 52, 54 and therefore mechanically, physically blocks the underlying dispersed area of sheet 10 from which the projections protrude from adhering to the glass, to control, by the number of projections 16, the adhesion of sheet 10 to glass panels 52, 54. In other words, the major regions of sheet 10 between projections 16 conventionally adhere in the areas shown as 58 in FIG. 2 to the surface of the glass panels through interaction of hydroxyl groups of the partial PVB resin with the glass surface. This macroscopic interference with adhesion is different from that occurring on an atomic or molecular scale using chemical adhesion control additives. The bonding force (if any) at the contact surface between glass and protrusions 56 is always less than the bonding force between the glass and gaps 58 between and without protrusions 56.

The invention provides an additional advantage when projections 16 are of a material impermeable to plasticizer in sheet 10. Scrap plasticized partial PVB sheet trimmed from laminated parts after autoclaving frequently cannot be reused since too stiff for recycling because excess plasticizer has been driven out of the sheet during exposure to elevated autoclave temperatures. When projections 16 are of a barrier material, such as crosslinked polyurethane, at the preferred 20–45% sheet coverages, significant plasticizer loss from unlaminated sheet during autoclaving should not occur and therefore such scrap losses are avoided. This is especially so when the refractive indices are substantially matched as previously noted since the projections at the noted preferred coverage range comprise only about 0.1 to 0.5% of the total weight of the sheet (0.76 mm thickness).

As illustrated in FIG. 2, laminated safety glazing 50 comprises at least one and preferably two sheets 52, 54 of rigid transparent material such as glass laminated to plastic interlayer sheet 10 having means dispersed in a discontinuous pattern on its surface in the form of a multitude of compressed projections 56 unbonded or weakly bonded to glass sheets 52, 54, the surface of the plastic sheet 10 without means 16 (i.e. regions 58) being firmly bonded to the glass sheet surfaces.

FIG. 3 shows an ordered pattern of projections covering about 22% of one side surface of a sheet which is a typical layout successfully used. To highlight the material and reveal the location of the projections with respect to each other, carbon black (not shown in FIG. 3) was included in the polyurethane formulation of the projections.

Figure 4:
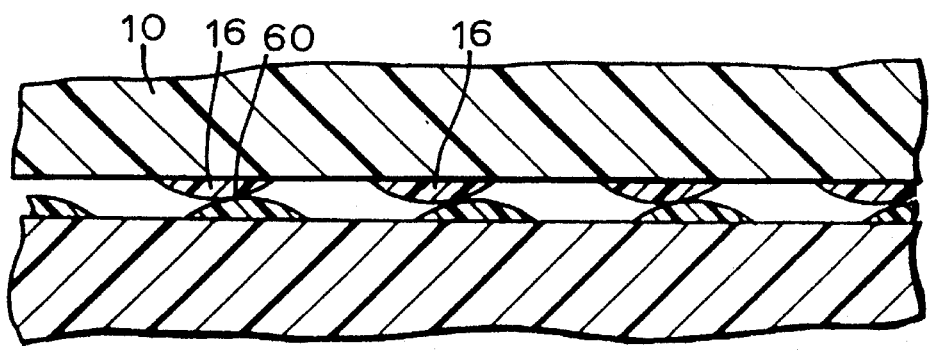
FIGS. 4 and 5 are views similar to FIG. 1 highlighting the block-resisting feature of the sheet of the invention.
Figure 5:
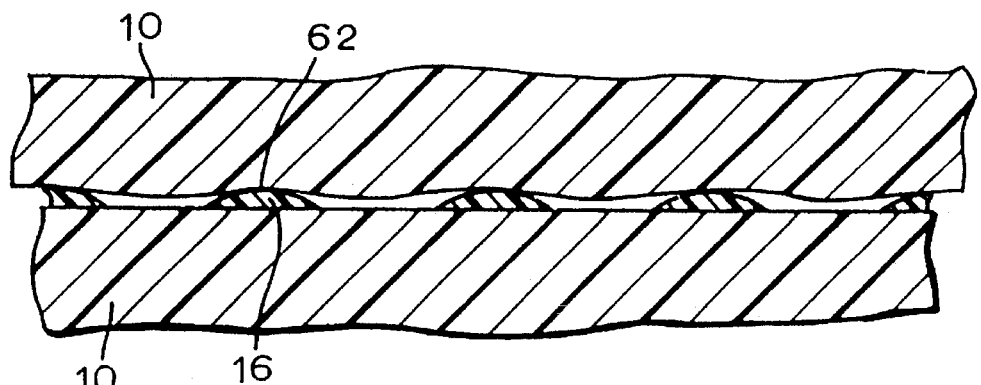

FIGS. 4 and 5 illustrate the block resistant feature of the invention when sheet 10 is the preferred plasticized partial PVB plastic. More particularly, when the sheet is in roll form or stacked as pieces one on top of another the surfaces of projections 16 abut each other in random manner as typically shown at 60, and since such projections are inert insofar as having little or no affinity for adhesion when in blocking contact with each other or with another plasticized partial PVB sheet surface, blocking resistance is improved or the tendency of the sheet to stick to itself is reduced. In the illustrated embodiment, inertness is provided by the crosslinked structure of the polyurethane.

In the FIG. 5 embodiment, projections 16 on one side only of the sheet resist sticking or blocking by abutting an opposing local sheet surface without projections such as illustrated at 62. In the embodiments of FIGS. 4 and 5, projections 62 are of the same preferred crosslinked polyurethane plastic as referred to in FIGS. 1, 2 and therefore resist adhesion to glass in a laminated safety glazing as described with respect to FIG. 2.

Projections 16 may be applied to the surface of sheet 10 by any known printing technique such as letterpress, gravure, rotogravure, dot and/or jet printer and the like. Letterpress is further described hereafter in the Examples.

The surface 14 of sheet 10 need not be entirely covered with means 12 and specifically with a pattern of projections 16. It may be desirable to provide local zones of high adhesion for specific applications by purposely leaving predetermined regions of the sheet free of projections or altering the pattern to leave more uncoated sheet surface between projections during the deposition operation. Moreover, when applied to both sides, the pattern of projections may be the same or different as dictated to achieve optimal performance. Projection configuration, projection pattern on the sheet surface and sheet surface area coverage can be conveniently typically set by the gravure plate pattern being used to deposit the projections to provide any desired level of adhesion to a rigid laminating panel or block resistance.

Partial PVB resin is produced by known aqueous or solvent acetalization processes where polyvinyl alcohol (PVOH) is reacted with butyraldehyde in the presence of an acid catalyst followed by neutralization of the catalyst, stabilization and drying of the resin. In a preferred embodiment, the partial PVB resin has a low titer (as hereinafter defined) of less than about 10 and preferably less than 5 as obtained by not using or avoiding use of significant quantities of chemical adhesion control additives when preparing the partial PVB resin.

Partial PVB resin must be plasticized with about 20 to 80, preferably 25 to 45, parts of plasticizer per 100 parts of resin. Usable plasticizers are disclosed in U.S. Pat. No. 4,654,179, col. 5, lines 56–65, the content of which is incorporated herein, by reference. Dihexyl adipate is preferred.

Plasticized partial PVB sheet is prepared using extrusion systems known to those in the art by forcing molten polymer through a horizontally long, vertically narrow die opening substantially conforming in length and width to that of the sheet being formed therein. Alternatively a die roll system can be used where the molten polymer from an extrusion die is cast onto a specially prepared roll surface turning in close proximity to the die exit to provide a rough surface for deairing on one side of the molten polymer. Thus, when the roll surface has minute peaks and valleys, sheet formed of polymer cast thereon will have a rough surface generally conforming to the valleys and peaks of the roll surface. Further details of construction of such a die roll are in U.S. Pat. No. 4,035,549, col. 3 line 46 through col. 4 line 44, the content of which is incorporated herein by reference.

In addition to plasticizer, partial PVB sheet may contain other additive to improve performance such as dyes, light stabilizers, antioxidants and the like.

The invention is further described in the following examples which are for illustration only and not to limit or restrict the invention. Unless otherwise indicated, amounts are in weight.

The following tests were used to obtain the results tabulated in the Examples.

A) Peel Adhesion

This measures bond strength between plasticized partial PVB and glass. Adhesion coated aluminum foil is initially conditioned at 105° C. for 30 min. Special peel adhesion laminates containing the sheet of the invention to be tested are prepared using standard laminating techniques by substituting the conditioned aluminum foil for one glass piece of a standard double glass layered laminate. The thickness of the plasticized partial PVB layer being tested is standardized at 0.76 mm. The coated foil is assembled to one side of the plasticized partial PVB sheet with the adhesive next to the plastic and a test glass layer assembled to the other side. Two such assembled laminates are placed with foil faces in contact and passed through deairing rolls. The laminates are then placed singly, with foil down, in an air oven at 105° C. for 5 minutes. The hot laminates are then assembled, rerolled as before and autoclaved at 146° C. at 1275 kPa for 30 min. After autoclaving, a 4 cm wide cut through the foil and plasticized partial PVB sheet is made using a special double wheeled cutter. The glass at one end of the laminate is then scored and broken. The outside edge of the aluminum foil and plasticized partial PVB sheet on each side of the 4 cm strip is cut at the glass break. At least three samples of a particular plasticized partial PVB sheet are tested per reported value. At the time of peel sample lay up a standard laminate used for moisture analysis is prepared from the same plasticized partial PVB sheet piece.

Before conducting the actual peel test, the samples are conditioned overnight at 21° C. During peel testing, the sample of glass, foil and plastic sheet are clamped in testing grips of an Instron peel. tester (cross-head speed of 12.7 cm per min) and a direct recorded measurement made of the force necessary to separate the plastic sheet from the glass. The average of the various recorded peaks is the value for the sample.

B) Impact Resistance

1) Mean Break Height—30.5×30.5 cm×0.76 mm two ply glass laminates prepared using the laminating conditions recited above were individually horizontally positioned in a support frame. While at a constant 21° C. laminate temperature, a 2.27 kg spherical ball was dropped from a designated height onto the center of the laminate. Two spaced magnetic coils were beneath the test laminate. After penetrating a laminate, the ball sequentially passed through the magnetic fields of the coils and as these fields were disturbed the top coil triggered a timer "on" switch while the bottom coil turned it off. Knowing the time to traverse the distance between coils permits calculating ball velocity. This residual ball velocity is related to energy absorbed by the laminate and absorbed energy in miles per hour (mph) relates to Mean Break Height. Measured MBH is the average of multiple ball drops from different heights.

2) Pummel Adhesion measures plastic sheet adhesion to glass. Two ply glass laminates prepared as recited above for the MBH test were conditioned to −17° C. and manually pummeled with a 1 pound (454 g) hammer to break the glass. All broken glass unadhered to the PVB layer was then removed. The amount of glass left adhered is visually compared with a set of standards of known pummel scale, the higher the number of the standard, the more glass remaining adhered to the PVB layer—i.e. at a pummel of zero, no glass at all is left whereas at a pummel of 10, 1.00% of the PVB layer surface is adhered to the glass. Desirable impact dissipation occurs at a pummel adhesion value of 3 to 7, preferably 4 to 6. At less than 3 too much glass is lost whereas at more than 7 adhesion is generally too high and shock absorption is poor.

C) Titer

This measures partial PVB resin alkalinity. Alkalinity is determined by dissolving seven gm of partial PVB resin or sheet and plasticizer in 250 cc of CP methanol and titrating using an automatic titrator with 0.005 normal hydrochloric acid to a pH end point of 4.2. The titer computed from this titration is the number of ml of 0.01N hydrochloric acid required to neutralize 100 g of resin.

D) Blocking

This measures the tendency of the plasticized partial PVB sheet to adhere to itself. 3.8 cm×15 cm and 2.5 cm×15 cm strips of test sheet were obtained for each test specimen. Six test specimens were required for one blocking determination. The strips were conditioned at 37° C. for 2 hrs. A 2.5 cm wide strip was placed over a 3.8 cm wide strip, mating the desired surfaces and these strips were passed through a clothes wringer, one pass with the narrow strip on top and a second with the wide strip on top. Three test specimens were placed on a 15.2 cm×15.2 cm Teflon-sprayed glass plate and covered with another similar glass plate for the next layer of three test specimens. The last layer of test specimens was covered with two glass plates and each stack was weighted with an 8 kg load for 30 min. The test samples were peeled from the glass plates and conditioned at (23° C.) (50% RH) for 30 min, then exposed to room atmosphere for 15 min. Each. test specimen was peeled in an Instron at 51 cm/min crosshead speed, 13 cm/min chart speed, 1.3 cm jaw separation. The average force to peel each specimen is noted and then the average for the six samples is reported.

% Haze—ASTM D1003-61 (Reapproved 1977)—Procedure A—using a Hazemeter, Hunterlab Model D25.

EXAMPLE 1

Preparation of Polyurethane

Polyurethane was prepared from the following components.

| Component | Gm |
| --- | --- |
| Methylene bis (4-cyclohexylisocyanate) | 15.79 |
| [1]Polyether triol | 14.05 |
| [2]Polyether capped triol | 15.26 |
| [3]Ethoxylated Trimethylol Propane (cross-linker) | 5.34 |
| Dibutyl tin diacetate | 200 ppm |
| Dow corning 57 (leveling agent) | 300 ppm |

[1]Niax LG-168, mol. wt. = 1000, from Union Carbide Corp., Danbury, Ct, synthesized by condensing glycerine and propylene oxide.
[2]Niax 11–27, mol. wt. = 6200, from Union Carbide Corp. Synthesized by capping the glycerine-propylene oxide adduct with ethylene oxide.
[3]Voranol 234–630, Dow Chemical Co.

The above components except the catalyst were stirred at room temperature for 2 min then deaired in a vacuum oven for 1 hr. The catalyst was then added and the formulation again stirred for 2 min to form uncrosslinked polyurethane having a viscosity of about 400 cps (0.4 Pa s).

Preparation of Plasticized Partial PVB Sheet with Adhesion-Resisting Projections Commercial grade Saflex® TG sheet nominally 0.76 mm thick was obtained from Monsanto Co. This sheet was of partial PVB resin having a hydroxyl content of 18.2% plasticized with about 32 parts of dihexyl adipate per 100 parts resin. The resin had a standard titer of 72 developed by use of potassium acetate adhesion control additive. The material of the sheet which was conditioned to 0.1% moisture had a standard textured or toughened deairing surface on each side. Using a profilometer, such roughness was measured as 203 to 254×10$^{-5}$ cm.

The polyurethane was poured on kraft paper and manually drawn down with a doctor blade. A flat metal gravure plate (30.5×30.5 cm) was obtained which had frusto-conical projections extending from its surface in a square array (655 projections per square cm of surface). The projections were truncated at various heights above the plate surface and the location of the truncating plane determined the eventual coverage of the plasticized partial PVB sheet—i.e. the size of the flat face at the truncated plane was proportional to the size of the transferred projection. The plate was placed on the liquid polyurethane coated paper with only the truncated projections contacting the liquid and then removed so that the polyurethane formulation then covered the surfaces of the truncated projections. FIG. 3 shows a particular pattern of polyurethane thus obtained, magnified 30 times. The plate coated with the polyurethane formulation was placed on the full surface of the plasticized partial PVB sheet with the truncated projections against the sheet. The plate and sheet were then passed through the nip of a pair of rubber faced pinch rolls with the nip opening set so the rolls slightly pinched the thickness of sheet and plate applying just enough roll pressure to transfer the curable but uncured polyurethane to the receptive sheet surface as a multiplicity of projections affixed on the sheet in the same pattern as the truncated projections of the gravure plate. The integral contact bond between the material of the projections and the partial PVB sheet was enhanced by formation of chemical urethane linkages during application of the polyurethane to the sheet through reaction of isocyanate groups of the polyurethane with hydroxyl groups of the partial PVB resin in the manner described in U.S. Pat. No. 4,937,147, the content of which is incorporated herein by reference. The sheet was then thermally cured in an oven at 70° C. for one hour to cross-link and render the polyurethane of the projections inert and resistive to adhesion when in contact with either a glass pane of a laminated safety glazing or another cross-linked projection or the untreated surface (i.e. without the presence of projections) of conventional plasticized partial PVB sheet. The procedure just described was then repeated to coat and cure the other side of the sheet. Using a confocal laser scanning microscope, the dimensions of the cylindrical projections (at 22% sheet surface coverage) were measured as about 0.20 mm in diameter and 0.03 mm height (20 and 18 respectively in FIG. 1). The cured polyurethane projections on the sheet were not visually apparent, the difference in % haze between untreated and surface treated sheet being a relatively insignificant 0.3%.

The refractive index of the polyurethane was determined by pouring a test amount of the uncured formulation on a watch glass, curing it in the oven as noted above, scraping the cured polyurethane off the watch glass and placing it in an Abbe refractometer where refractive index was measured as 1.4870. The refractive index of the untreated sheet (obtained after heating to smooth the textured surfaces) was about the same as that of the cured polyurethane being measured similarly as 1.4814. Such similarity in refractive indices provided clarity in the surface treated sheet in that the projections were not visually discernable from the untreated surface between projections.

EXAMPLE 2

Similar runs as above described in Example 1 were made using a polyurethane formulation tailored for curing with ultraviolet light and with different gravure plates, each having 655 frusto-conical projections per sq cm of surface but with cones truncated at different heights. Curing occurred by passing the treated sheet under a bank of ultraviolet lights (700 mJ/cm$^2$ total energy output) at 7.6 m/min. Sheet coverage was determined from the exposed area of a truncated cone at the truncated plane times the number of cones per plate divided by the plate face area.

Performance results were as follows:

TABLE 1

| Test | Extent of Sheet Surface Coverage (%) | | | | |
|---|---|---|---|---|---|
| | 0 | 12 | 22 | 36 | 100 |
| Peel (N/cm) | 78.68 | 58.59 | 45.43 | 40.21 | 4.05 |
| Pummel (0.32% H$_2$O) | 7 | 3 | 2 | 1.5 | 0 |
| Impact (MBH-FT) | 12.3 | 15.8 | 19.5 | 27.8 | — |
| Anti-roll Blocking (g/cm) | 43.80 | 28.83 | 16.28 | 5.67 | 5.37 |

The above results show that the cross-linked polyurethane projections control adhesion to glass and reduce blocking at sheet coverages of between 12 to 36%. As sheet coverage increases, adhesion (glass to PVB) decreases.

The control at 0% coverage is representative of results obtained according to the prior art where adhesion control is achieved through chemical additives and moisture in the sheet formulation.

The above data supports use of the invention as a convenient method of controlling adhesion after manufacture of the plastic laminating sheet, as opposed to doing so with chemical additives where sheet adhesion is dictated by the formulation from which the sheet is made. This important advantage facilitates provision of different adhesion levels in a sheet made from a common formulation which is desirable when different sheet customers desire different adhesion levels.

Moreover, since the polyurethane formulation was 100% solids (no solvent) commercial production is facilitated by using a fast curing formulation (note e.g. the content of U.S. Pat. No. 4,037,147 referred to above) (e.g. by exposure to ultraviolet light). Sheeting may be conveniently processed continuously by successively printing (i.e. applying projections) curing and accumulating in bulk roll form for shipment to customers.

EXAMPLE 3

This shows conforming a low titer (i.e. very high adhesion) plasticized partial PVB sheet provided with adhesion-resisting projections of the invention with the performance of a conventional prior art sheet using chemical additives to control adhesion—i.e. the 0% control of Example 2 above. In this regard, the preferred low titer partial PVB resin exposed between the dispersed projections in the plastic sheet to be used in the laminated safety glazing maximizes adhesion to glass and avoids deleterious effects which chemical adhesion control additives might have on other performance properties of the sheet, such as delamination of the safety glazing along the edge region where additives in the exposed edge of the sheet (in the thickness direction) may undesirably react with atmospheric moisture to promote delamination.

Low titer plasticized partial PVB sheet was made from the following formulation:

100 parts partial PVB resin prepared by aqueous acetalization having a potassium acetate titer of 6.9 and a hydroxyl content of 20.4%;

32 parts dihexyl adipate plasticizer dispersed in such resin;

0.128 parts—magnesium 2-ethyl butyrate (30% aqueous solution) (280 ppm total dry solids)

The aqueous magnesium salt solution was initially dissolved in the plasticizer which was then mixed into the resin in a non-fluxing mixer.

The formulation was melt shaped using an extruder-die roll system into 0.8 mm thick sheet having a roughness value of 23 microns on one side and 25 microns on the other side.

Two ply glass laminates prepared with this sheet in conventional manner had the following property:

Pummel Adhesion (0.5% $H_2O$) 7.5

From this pummel value, this sheet would be unacceptable in a commercial laminated safety glazing since adhesion is too high.

Using the procedure of Example 1, the above sheet of this Example 3 was provided on both sides with the cross-linked polyurethane adhesion-resisting projections at a 36% sheet coverage level. Results on the treated sheet were:

Pummel Adhesion (0.5% $H_2O$) 5

The above data of this Example 3 compares well with results obtained conventionally using chemical additives to control adhesion (0% coverage in Example 2) and illustrates use of a regulated pattern of projections according to the invention to counteract high adhesion of low titer sheet to glass between the adhesion-resisting projections. Though not actually measured, based on a projection of what mean break height (MBH) would be, for the noted above in this Example 3 having the noted pummel adhesion, the level or number of projections on the sheet surface would be sufficient to reduce adhesion of the sheet to the extent effective (in a laminate of such sheet at 0.76 mm thickness with two rigid panels) to provide a mean break height of between about 4.5 to 11 m measured at 21° C. when measured using the MBH test previously described.

The preceding description is for illustration only and is not to be taken in a limited sense. Various modifications and alterations will be readily suggested to persons skilled in the art. It is intended, therefore, that the foregoing be considered as exemplary only and that the scope of the invention be ascertained from the following claims.

We claim:

1. A plasticized partial polyvinyl butyral sheet for a laminated safety glazing having means dispersed on its surface capable of resisting adhesion to a rigid panel of such safety glazing when the sheet is laminated to such panel, the area of the sheet surface without such dispersed means having high affinity relative to that of the dispersed means for adhesion to said panel.

2. The sheet of claim 1 wherein the dispersed means comprises a multiplicity of spaced projections.

3. The sheet of claim 2 wherein the projections are in an ordered pattern.

4. The sheet of claim 3 wherein the projections are formed of a plastic material different from that of the sheet.

5. The sheet of claim 4 wherein the projections cover from about 10 to about 60% of the surface area of the sheet from which they project.

6. The sheet of claim 5 wherein the projections extend at least about 0.5 mils away from the surface of the sheet.

7. The sheet of claim 4 wherein the refractive index of the plastic of the projections is about the same as the refractive index of the partial polyvinyl butyral of the sheet.

8. The sheet of claim 6 wherein the projections are present on both sides of the sheet.

9. The sheet of any of claims 2, 3, 4, 5, 6, 7 or 8 wherein the projections are formed of cross-linked polyurethane.

10. The sheet of claim 9 wherein the partial polyvinyl butyral includes about 10 to 30 weight percent hydroxyl groups as polyvinyl alcohol.

11. The sheet of claim 10 wherein about 38 to 3800 projections are present per square centimeter of sheet surface.

12. A sheet of plasticized partial polyvinyl butyral having a multiplicity of spaced projections of cross-linked polyurethane on about 10 to about 60% of its surface, the refractive index of the polyurethane substantially matching that of the plasticized partial polyvinyl butyral.

13. The sheet of claim 12 wherein the projections extend at least about 0.5 mils from the surface of the sheet.

14. A plastic sheet for a laminated safety glazing comprising partial polyvinyl butyral resin having a titer less than about 10 containing a dispersed plasticizer, said sheet having means dispersed on its surface capable of resisting adhesion to a rigid panel of such safety glazing when the sheet is laminated to such panel, the area of the sheet surface without such dispersed means having high affinity to said panel relative to that of the dispersed means, such means being present on the sheet surface at a level sufficient to reduce adhesion of the sheet to the extent effective, in a laminated safety glazing of such sheet at 0.76 mm thickness with two such rigid panels, to provide a mean break height of between about 4.5 to 11 m measured at 21° C.

15. A method of controlling adhesion of a safety glazing sheet of partial polyvinyl butyral to a rigid laminating panel which comprises physically blocking adhesion of a dispersed area of the sheet to the panel by means on the sheet surface having no or weak interfacial adhesion to the panel.

16. The method of claim 15 wherein the means is a multiplicity of spaced projections.

17. The method of claim 15 wherein the extent of blocking is about 10 to about 60% of the interfacial contact area between the sheet and the panel.

18. The method of claim 17 wherein the partial polyvinyl butyral contains about 10 to 30 weight percent hydroxyl groups as polyvinyl alcohol.

19. The method of claim 18 wherein the refractive indices of the partial polyvinyl butyral and projections are about the same.

20. The method of claim 19 wherein the projections comprise cross-linked polyurethane.

21. The method of claim 20 wherein the panel is glass.

22. A safety glazing comprising at least one glass sheet laminated to a plastic sheet of partial polyvinyl butyral having dispersed on its surface means unbonded or weakly bonded to the glass sheet, the surface of the plastic sheet without such means being firmly bonded to the glass sheet relative to the unbonded or weakly bonded dispersed means.

23. The safety glazing assembly of claim 22 wherein the means dispersed on the surface of the plastic sheet comprises a multiplicity of spaced projections.

24. The safety glazing assembly of claim 22 wherein the means in unbonded or weakly bonded contact with the glass comprise projections on about 10 to about 60% of the surface area of the sheet in contact with the glass.

25. The safety glazing assembly of claim 24 wherein the partial polyvinyl butyral contains about 10 to 30 weight percent hydroxyl groups as polyvinyl alcohol.

26. The safety glazing assembly of claim 25 wherein the refractive indices of the partial polyvinyl butyral and projections are about the same.

27. The safety glazing assembly of claim 26 wherein the projections comprise cross-linked polyurethane.

28. The sheet of claim 1 wherein the dispersed means are on each side of the sheet.

29. The sheet of claim 28 wherein the dispersed means comprises a multitude of spaced projections, the projections on one side of the sheet being in a pattern which is different from the pattern of projections on the other side of the sheet.

* * * * *